(12) United States Patent
Bertens et al.

(10) Patent No.: US 9,153,016 B2
(45) Date of Patent: Oct. 6, 2015

(54) METHOD AND SYSTEM FOR ENHANCING CONTRAST OF SPATIALLY-LOCALIZED PHENOMENA IN MAMMOGRAPHY IMAGE

(75) Inventors: Tom Bertens, Perk (BE); Pieter Vuylsteke, Mortsel (BE); Gert Behiels, Edegem (BE)

(73) Assignee: Agfa Healthcare NV, Mortsel (BE)

( * ) Notice: Subject to any disclaimer, the term of this patent is extended or adjusted under 35 U.S.C. 154(b) by 415 days.

(21) Appl. No.: 12/911,170

(22) Filed: Oct. 25, 2010

(65) Prior Publication Data

US 2011/0123089 A1    May 26, 2011

Related U.S. Application Data

(60) Provisional application No. 61/264,364, filed on Nov. 25, 2009.

(30) Foreign Application Priority Data

Nov. 25, 2009    (EP) .................................... 09014653

(51) Int. Cl.
*G06K 9/00* (2006.01)
*G06T 5/40* (2006.01)
(Continued)

(52) U.S. Cl.
CPC . *G06T 5/40* (2013.01); *G06T 5/008* (2013.01); *G06T 7/0081* (2013.01); *G06T 7/0091* (2013.01); *G06T 2207/10081* (2013.01); *G06T 2207/20016* (2013.01); *G06T 2207/20152* (2013.01); *G06T 2207/30068* (2013.01)

(58) Field of Classification Search
CPC ......... G06T 5/40; G06T 5/008; G06T 7/0081; G06T 7/0091; G06T 2207/10081; G06T 2207/30068; G06T 2207/20016; G06T 2207/20152

USPC ......... 382/128, 130, 131, 132, 204, 205, 195, 382/196, 263, 264, 274, 275, 283, 298, 299, 382/300

See application file for complete search history.

(56) References Cited

U.S. PATENT DOCUMENTS

| | | | |
|---|---|---|---|
| 5,805,721 | A | 9/1998 | Vuylsteke et al. |
| 2005/0135695 | A1 | 6/2005 | Bernard et al. |
| 2009/0174727 | A1 | 7/2009 | Heinlein et al. |

FOREIGN PATENT DOCUMENTS

| | | | |
|---|---|---|---|
| EP | 1341125 A2 | 9/2003 | |
| EP | 1347413 A1 | 9/2003 | |
| EP | 1933272 A1 | 6/2008 | |

(Continued)

OTHER PUBLICATIONS

Morrow et al., "Region-Based Contrast Enhancement of Mammograms," IEEE Transactions on Medical Imaging, Sep. 1, 1992, pp. 392-406, vol. 11, No. 3, Institute of Electrical and Electronics Engineers, New York, USA.

(Continued)

*Primary Examiner* — Brian Le
(74) *Attorney, Agent, or Firm* — Keating & Bennett, LLP (57) ABSTRACT

In a method to enhance the contrast of spatially-localized phenomena in an image such as microcalcifications in a mammogram, a multi-scale decomposition is applied to a digital signal representation of the image thereby generating a number of detail images at different scales, the detail signals pertaining to the spatially-localized phenomena having a common polarity (either negative or positive) being modified at at least one scale.

19 Claims, 6 Drawing Sheets

(51) Int. Cl.
G06T 5/00 (2006.01)
G06T 7/00 (2006.01)

(56) References Cited

FOREIGN PATENT DOCUMENTS

| EP | 2017786 A1 | 1/2009 |
|---|---|---|
| EP | 2026278 A1 | 2/2009 |
| EP | 2048616 A1 | 4/2009 |
| EP | 2071513 A1 | 6/2009 |

OTHER PUBLICATIONS

Unser et al., "A Review of Wavelets in Biomedical Applications," Proceedings of the IEEE, Apr. 1, 1996, pp. 626, vol. 84, No. 4, Institute of Electrical and Electronics Engineers, New York, USA.

Gurcan et al., "Automated Detection and Enhancement of Microcalcifications in Mammograms Using Nonlinear Subband Decomposition," International Conference on Acoustics, Speech, and Signal Processing, 1997, pp. 3069, vol. 4, Institute of Electrical and Electronics Engineers.

Boccignone et al., "Computer aided detection of microcalcifications in digital mammograms," Computers in Biology and Medicine, Sep. 2000, pp. 267-286, vol. 30, No. 5, Elsevier Science, UK.

Mini et al., "Multiplexed Wavelet Transform Technique for Detection of Microcalcification in Digitized Mammograms," Journal of Digital Imaging, Dec. 1, 2004, pp. 285-291, vol. 17, No. 4, Springer-Verlag, NE.

Dabour, "Improved Wavelet Based Thresholding for Contrast Enhancement of Digital Mammograms," 2008 International Conference on Computer Science and Software Engineering, Dec. 12, 2008, pp. 948-951, Institute of Electrical and Electronics Engineers, Piscataway, USA.

European Search Report, dated May 7, 2010, from corresponding European Application No. EP 09014653.1, filed Nov. 25, 2009.

METHOD AND SYSTEM FOR ENHANCING CONTRAST OF SPATIALLY-LOCALIZED PHENOMENA IN MAMMOGRAPHY IMAGE

RELATED APPLICATIONS

This application claims priority to European Patent Application No. 09014653.1. filed on Nov. 25, 2009, and claims the benefit under 35 USC 119(e) of U.S. Provisional Application No. 61/264,364, filed on Nov. 25, 2009, both of which are incorporated herein by reference in their entirety.

BACKGROUND OF THE INVENTION

Computer-aided detection and enhancement of microcalcifications in mammogram images is described by Gürcan et. al. in "Automated Detection and Enhancement of Microcalcifications in Mammograms Using Nonlinear Subband Decomposition," Icassp, vol. 4, pp. 3069, 1997 IEEE International Conference on Acoustics, Speech, and Signal Processing (ICASSP'97)-Volume 4, 1997.

Also in US patent application 2005/0135695 a similar approach is described.

The general idea of the described method is a 3-step process to create an enhanced mammogram image: 1. detection of microcalcifications in the image, 2. segmentation of the microcalcifications in the image and 3. enhancing the microcalcifications in an image.

The prior art proposes two approaches to create an enhanced version of the mammogram: the amplification technique and the superposition technique.

In the amplification technique the pixel values of the original image are amplified by an amplification factor at the locations of microcalcifications which are provided e.g. by a computer aided detection system. The amplification factor can be fixed or may depend on the characteristics of the segmented microcalcification and its surrounding tissue.

In the superposition technique segmented microcalcifications are superimposed on the original mammogram image at the locations of the microcalcifications.

For both techniques the enhancement of the microcalcifications in the processed result image strongly depends on the accuracy of the segmentation of the individual microcalcifications. This can lead to abrupt transitions and an artificial enhancement at the boundaries of the segmented regions. Image enhancement based on an inaccurate segmentation can possibly change the shape of the microcalcifications.

An accurate delineation of microcalcifications in a mammogram image is difficult, especially in a mammogram generated with computed radiography technology because of the poor contrast-to-noise ratio of the microcalcifications in the image.

Another technique to optimize the visualization in a subsection of a mammogram image is used by Heinlein et. al. in US patent application 2009/0174727, entitled "Method and apparatus for improved display of digital mammographic images".

The idea described in this patent application is to optimize the contrast in a subsection of the image by applying a spreading function to the range of values of the pixels in the subsection and by decreasing the contrast optimization towards the boundary of the subsection by applying a weighing function in order to create a gradual transition of the contrast between the subsection and the rest of the image.

SUMMARY OF THE INVENTION

This present invention relates to image enhancement to be used for example in the field of medical imaging.

More specifically the present invention relates to an image enhancement method to be used to modify the appearance of spatially-localized phenomena, e.g. microcalcification-like structures within a mammogram image, by locally enhancing the contrast.

It is an object of the present invention to provide a method for locally enhancing the contrast of an image that is represented by a digital signal representation that overcomes the prior art inconveniences.

More specifically it is an object of this invention to provide a method for multiscale image enhancement of an image that renders an enhanced image with increased local contrast to enhance spatially-localized phenomena.

The above-mentioned advantageous effects are realized by a computer-implemented method of enhancing the contrast of spatially localized phenomena in a medical image. The method comprises applying a multi-scale decomposition to a digital signal representation of the image thereby generating a number of detail images at different scales. The detail signals that pertain to the spatially localized phenomena having a first common polarity are modified at at least one of the scales and detail signals pertaining to the localized phenomena having a second common polarity are left un-changed.

In embodiments, modification is preceded by a thresholding step applied to the detail signals of common polarity. Also, the spatial extent of the region to which the modification is applied is limited to pixels within a neighbourhood of fixed shape surrounding the position of said spatially localized phenomena.

In some cases, the spatial extent of the region to which the modification is applied is determined by applying connected component analysis at said position(s). In other cases, the spatial extent of the region to which the modification is applied is determined by a region growing method having the position(s) of said spatially-localized phenomena as seed point(s).

In further aspect of embodiments, the spatial extent of the region to which the modification is applied is computed by applying a segmentation algorithm thereby generating a binary mask signal and by interpolating or reducing the mask signal to the resolution at which the modification is performed. Also, the modification comprises applying an amplification factor to the multiscale detail signals to be modified and the modification comprises applying an offset to the multiscale detail signals to be modified.

In some examples, the modification comprises applying a look up table operation to the multiscale signals to be modified. Also, the scale at which said modification is applied corresponds with the dimensions of the spatially localized phenomena of which the contrast is to be enhanced.

In general the invention also features a computer program product stored in a computer readable non-transitory medium, such as a compact disk or harddrive, adapted to carry out the method when run on a computer.

In general the invention also features a computer readable medium comprising computer executable program code adapted to carry out the steps of the method.

In general the invention also features a mammography system and computer system for enhancing the contrast of spatially localized phenomena in a medical image produced by the mammography system. The computer system applies a multi-scale decomposition to a digital signal representation of the image thereby generating a number of detail images at different scales. The detail signals that pertain to the spatially localized phenomena having a first common polarity are modified at at least one of the scales and detail signals pertaining to the localized phenomena having a second common polarity are left unchanged by the computer system. The resulting enhanced image is reviewed by a radiologist or computer system executing an image recognition program to generate a diagnosis for the patent from which the image was taken by the mamography system.

Further advantages and embodiments of the present invention will become apparent from the following description and drawings.

The present invention thus relates to multi-scale image enhancement in which spatially-localized phenomena derived from the image are used to locally steer the multi-scale image enhancement.

The location within the image of spatially-localized phenomena can be encoded by using e.g. bit masks or a list of coordinates and are e.g. provided by a computer aided detection system.

Other characteristics of the spatially-localized phenomena, as there are the size or the shape, can be used to steer the amount of multiscale image enhancement.

The subject of the present invention specifically concerns the segmentation and enhancement step. By steering the multiscale image enhancement at the locations of the microcalcifications a natural enhancement is achieved without the need for an accurate segmentation method.

U.S. Pat. No. 5,805,721, which is incorporated herein by this reference, describes a multiscale image enhancement method that is adapted to enhance the local contrast of spatially-localized phenomena in one embodiment. More specific embodiments of multiscale enhancement methods have been described in the following patent applications: EP-A-1933272, EP-A-2017786, EP-A-2026278, EP-A-2048616, EP-A-2071513.

The method of the present invention is generally implemented in the form of a computer program product adapted to carry out the method steps of the present invention when run on a computer. The computer program product is commonly stored in a computer readable carrier medium such as a DVD. Alternatively the computer program product takes the form of an electric signal and can be communicated to a user through electronic communication.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 9:
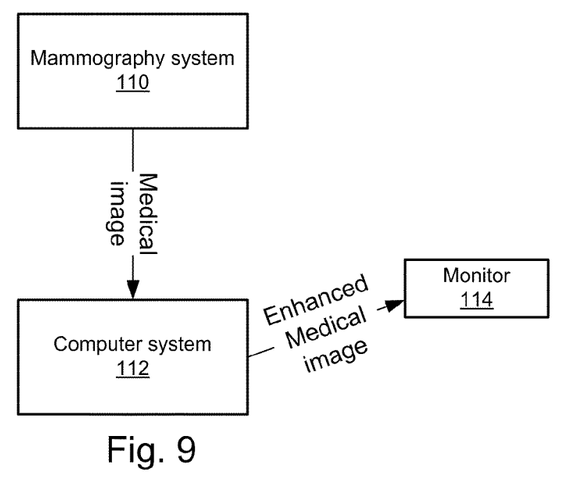
FIG. 9 is a block diagram showing a system that generates medical images and enhances the contrast of spatially-localized phenomena in the medical images.

With reference to FIG. 9, a multiscale image enhancement method (also called multiresolution image enhancement method) executed by a computer 112. It is used to convert grey value pixels of a raw digital image that was generated by an image acquisition device, such as a mammography system 110, into values suitable for reproduction or displaying. In other examples, the raw digital image are obtained by various acquisition techniques such as computed radiography, direct radiography, tomography in addition to mammography. This generates the enhanced medical image that is presented to the user, such as radiologist via a display or computer monitor 114 or printed to a hard copy.

Figure 10:
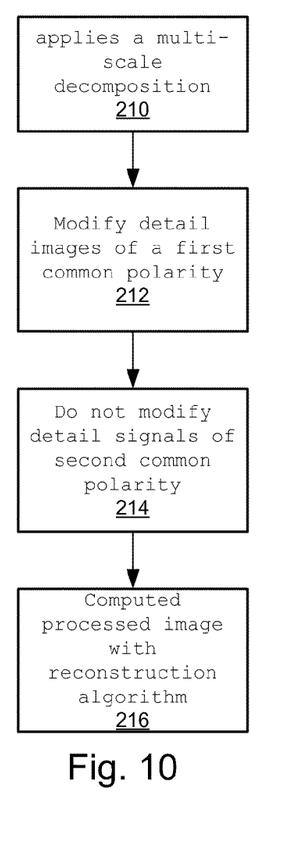
FIG. 10 is a flow diagram showing a computer-implemented method of enhancing the contrast of spatially-localized phenomena in a medical image.

With reference to FIG. 10, according to this multiscale image enhancement method, an image, represented by an array of pixel values, is processed by applying the following steps. First the original image is decomposed into a sequence of detail images at multiple scales (resolution levels) and occasionally a residual image in step 210. Next, the pixel values of the detail images are modified by applying to these pixel values at least one conversion, such as images of a first common polarity, step 212 while not modifying images of a second polarity, step 214. Finally, a processed image is computed by applying a reconstruction algorithm to the residual image and the modified detail images in step 216.

Generally the conversion operation on the detail images is applied to the whole image. For local modifications of the detail images, one has to be careful with respect to the spatial extent of local modifications. Inaccurate segmentation of the spatially-localized phenomena can result in distortions in the multiscale reconstructed image to an extent that the appearance becomes unnatural. The shape and the size of the spatially-localized phenomena can be unintentionally modified.

Using the multiscale decomposition and using the known pixel intensity relationship between the spatially-localized phenomenon and its surroundings, the need for an accurate segmentation method can be avoided by applying the method of the present invention.

In the raw image microcalcifications have lower grey pixel values than their surroundings. This results in detail signals of a first polarity, e.g. negative signals, within the boundaries of the microcalcifications and detail signals of a second polarity, e.g. positive signals, outside the boundaries of the microcalcifications. By modifying only detail signals of the first polarity, in this case the negative signals, in the direct neighborhood of the given microcalcification position, the appearance of the microcalcification in the multiscale reconstructed image is enhanced without affecting the surrounding tissue.

Figure 1:
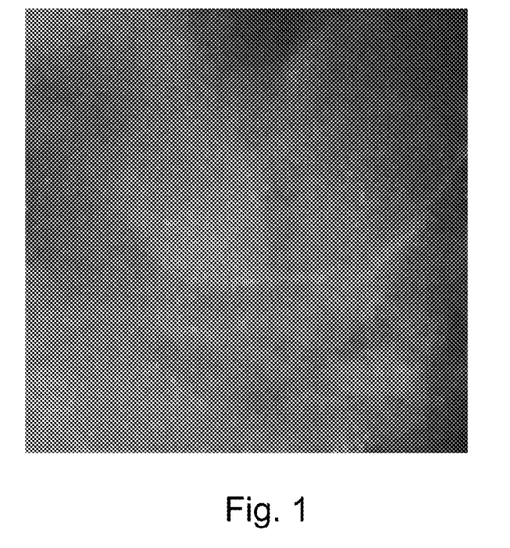
FIG. 1 shows a part of an enhanced mammogram image using a prior art multi-scale image enhancement method.
Figure 2:
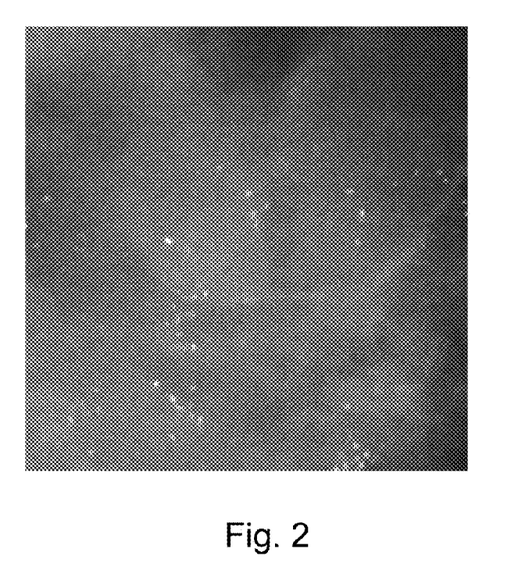
FIG. 2 shows a part of an enhanced mammogram image using the adapted multi-scale image enhancement method of the present invention to make the spatially-localized phenomena of interest readily noticeable.
Figure 3:
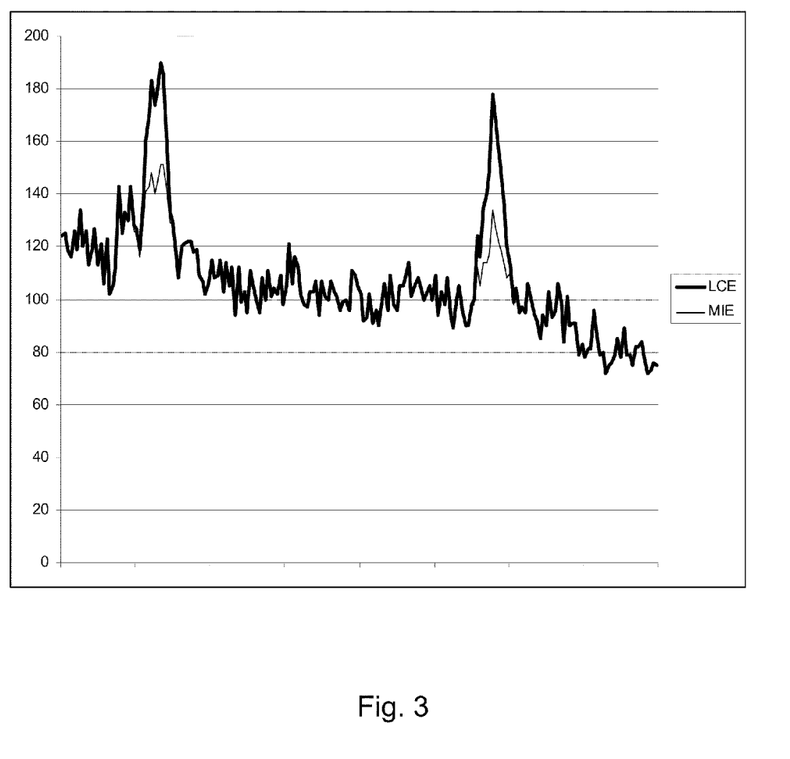
FIG. 3 shows a horizontal profile (profile corresponding with the result of the line-wise scanning of one line in the image) of the enhanced mammogram image with multiscale image enhancement (MIE) and the adapted multiscale image enhancement with increased local contrast (LCE).
Figure 4:
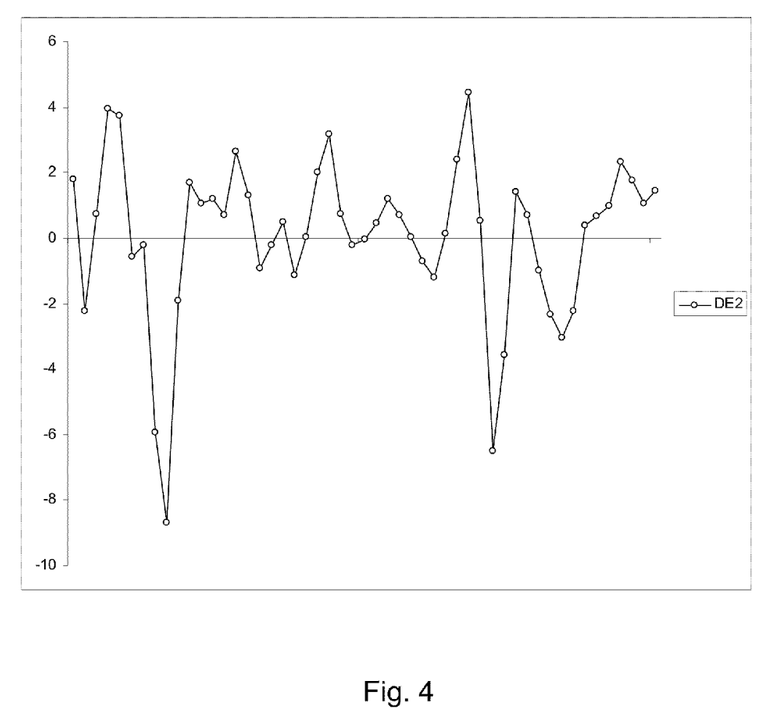
FIG. 4 shows the detail signal at scale 2 (successive scales of the decomposition being indicated by successive numerals whereby scale 0 is the finest scale) of the horizontal profile in the multiscale image decomposition of the raw (unprocessed digital) input image.
Figure 5:
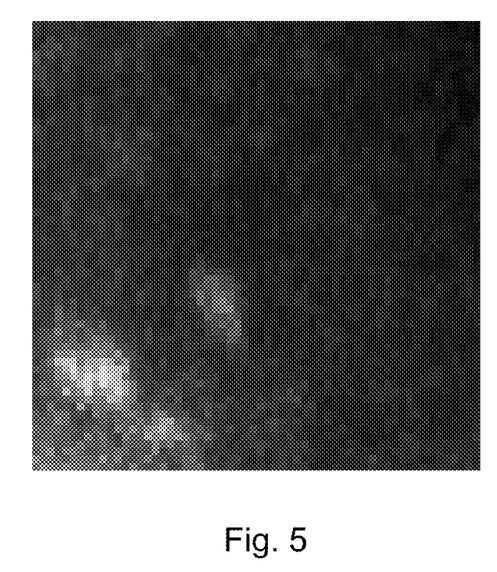
FIG. 5 shows a part of a mammogram with 3 microcalcifications in the bottom left corner.

FIG. 5 shows a part of an unprocessed mammogram image with signs of 3 microcalcifications in the bottom left corner. Due to the noise it is difficult to segment the individual microcalcifications at pixel level. The pixel resolution is 50 µm.

In the multiscale image decomposition the digital mammogram image is decomposed into detail signals which represent the pixel value difference of pixels with its local neighborhood and this at different resolution levels.

As the typical size of microcalcifications ranges from 100 µm to 500 µm, the response of the detail signals at the location of microcalcifications should be significant at scale 1 and 2.

Figure 6:
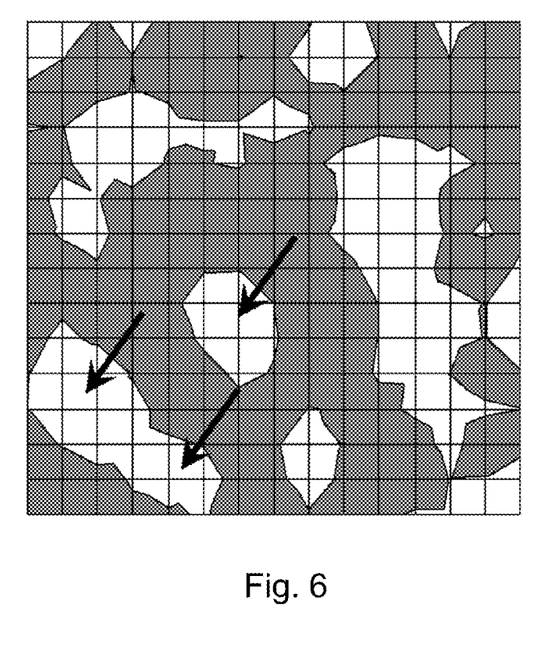
FIG. 6 shows the detail signal at scale 2 in the multiscale decomposition. The white areas are represented by negative detail signals, the grey areas are represented by positive detail signals. The arrows indicate the positions of the microcalcifications.
Figure 7:
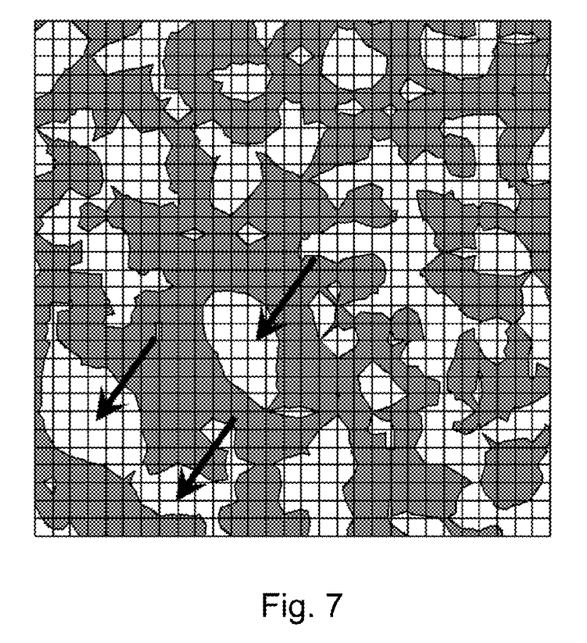
FIG. 7 shows the detail signal at scale 1 in the multiscale decomposition. The white areas are the negative detail signals, the grey areas are the positive detail signals. The arrows indicate the positions of the microcalcifications.
Figure 8:
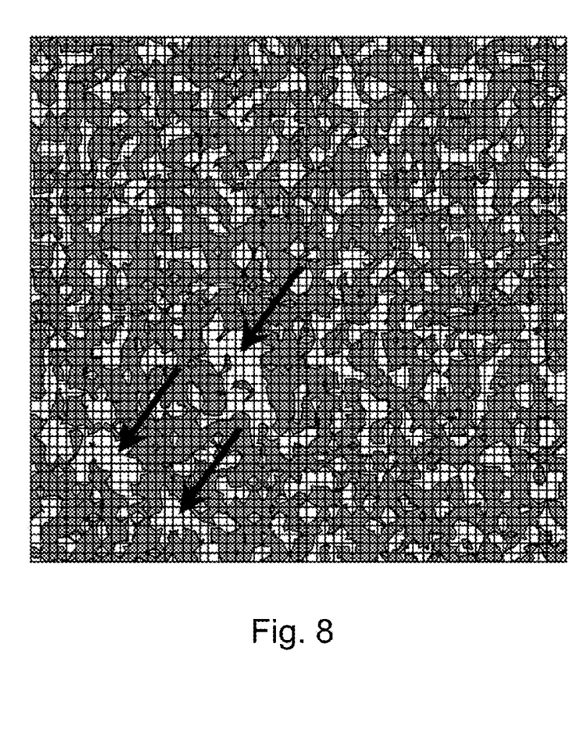
FIG. 8 shows the detail signal at scale 0 in the multiscale decomposition. The white areas are the negative detail signals, the grey areas are the positive detail signals. The arrows indicate the positions of the microcalcifications.

FIG. 6 shows the detail signals at scale 2, i.e. a pixel resolution of 200 µm.

The white regions correspond with negative detail signals, the gray regions with the positive detail signals. There is a strong correlation between the localization of the microcalcifications in the unprocessed mammogram image and the negative detail signals at scale 2.

There is also a strong correlation at scale 1, i.e. a pixel resolution of 100 µm.

At scale 0 the correlation is disturbed by the noise. Therefore one has to be careful with the amount of enhancement at scale 0.

The criterion of only enhancing the negative detail signals can be strengthened by only enhancing the detail signals below a threshold, which can for example be a measured noise level in the image. This is a way to deal with the disturbing impact of noise at the detail signals at e.g. scale 0.

Different techniques exist to determine the spatial extent at a specific scale in which the negative detail signals must be enhanced given the coordinates of spatially-localized phenomena.

In a first embodiment the spatial extent has a fixed shape, such as a circle or rectangle, that roughly defines the region in which the detail signals, in this example the negative detail signals, must be enhanced.

In a second embodiment the spatial extent is determined at subsequent scales by applying a connected component analysis at the given coordinates of the spatially-localized phenomena. As criterion in the connected component analysis the sign of the detail signals is used.

In a third embodiment the spatial extent is determined by applying a region growing method whereby the given coordinates of the spatially-localized phenomena are used as seed points.

Another embodiment is to apply a segmentation method to the grayscale image at a certain resolution e.g. the watershed algorithm to delineate the microcalcifications around the given coordinates. The result is a binary mask that is extended using morphologically filtering (e.g. dilation filter) to enclose the microcalcifications in the image. This binary mask is interpolated or reduced to match the resolution of the detail signals in the multiscale decomposition. Negative detail signals indicated by the binary mask are enhanced.

The amount of enhancement can be fixed or can depend on local characteristics of the spatially-localized phenomena and its surrounding, as well in the grey value representation as in the multiscale representation.

There are different ways to locally modify the detail signals.

In an embodiment of the invention the modification comprises applying an amplification factor to the multiscale signals to be modified, e.g. to the negative detail signals with the amplification factor depending on the following non-exhaustive list of characteristics: a global amplification factor, a scale-dependant amplification factor, the average intensity of the surrounding, the intrinsic contrast of the spatially-localized phenomena, and a probability metric of the spatially-localized phenomena.

This additional modification of the detail signals can be combined with other known multiscale image processing method as there are multiscale gradation processing (EP1341125) and multiscale contrast enhancement processing (EP1347413).

The global amplification factor determines the intended average amount of local contrast enhancement of the spatially-localized phenomena.

The scale-dependent amplification factors make it possible to modify the detail signals more on those scales where the spatially-localized phenomena have the strongest response. For microcalcifications this is typically at the scales with resolution 100 µm and 200 µm.

Using the average or median intensity of the surrounding to adjust the amplification factor allows increasing the enhancement of the spatially-localized phenomena in regions where they are difficult to notice. Microcalcifications are harder to notice in dense, bright areas and thus need stronger local contrast enhancement for these regions.

Adapting the amplification factor by a measurement of the intrinsic contrast of the spatially-localized phenomena with its surrounding introduces an equalization of the local contrasts of the individual spatially-localized phenomena in such a way that low-contrast spatially-localized phenomena are amplified more than high-contrast spatially-localized phenomena, which need less amplification for visualization.

A probability metric of the spatially-localized phenomena can be computed out of the similarity of the spatially-localized phenomena with the characteristics of microcalcifications.

In still another embodiment Look Up tables can be used to modify the multiscale signals to be modified, e.g. the negative detail signals whereby the Look Up tables may depend on the non-exhaustive list of characteristics described above.

Another embodiment is to apply an offset to the multiscale detail signals to be modified, e.g. to subtract an offset of the negative detail signals whereby the offset depends on the non-exhaustive list of characteristics described above.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-implemented method of enhancing a contrast of spatially localized phenomena in a medical image, the method comprising:

applying a multi-scale decomposition to a digital signal representation of the medical image to generate detail images at different scales;

after the multi-scale decomposition applying step, modifying detail signals in the detail images pertaining to the spatially localized phenomena having a first common polarity at at least one of the scales, a spatial extent of a region to which the modifying step is applied being limited to pixels within a neighborhood surrounding a position of the spatially localized phenomena, and the modifying step includes applying an amplification factor to the detail signals to be modified or applying a look up table operation to the detail signals to be modified; and leaving unchanged ones of the detail signals pertaining to the spatially localized phenomena having a second common polarity.

2. The method according to claim 1, wherein the modifying step is preceded by a thresholding step applied to the detail signals having common polarity.

3. The method according to claim 1, wherein the spatial extent of the region to which the modifying step is applied has a fixed shape.

4. The method according to claim 1, wherein the spatial extent of the region to which the modifying step is applied is determined by applying connected component analysis at the position(s) of the spatially localized phenomena.

5. The method according to claim 1, wherein the spatial extent of the region to which the modifying step is applied is determined by a region growing method having the position(s) of the spatially-localized phenomena as seed point(s).

6. The method according to claim 1, wherein the spatial extent of the region to which the modifying step is applied is computed by applying a segmentation algorithm to generate a binary mask signal and by interpolating or reducing the binary mask signal to a resolution at which the modifying step is performed.

7. The method according to claim 1, wherein the modifying step includes applying the amplification factor to the detail signals to be modified.

8. The method according to claim 1, wherein the modifying step includes applying the look up table operation to the detail signals to be modified.

9. The method according to claim 1, where the scale at which the modifying step is applied corresponds with dimensions of the spatially localized phenomena of which the contrast is to be enhanced.

10. A computer program product embodied on a non-transitory computer readable medium adapted to carry out the method of claim 1 when the computer program product runs on a computer.

11. A non-transitory computer readable medium including computer executable program code adapted to perform a method of enhancing contrast of spatially localized phenomena in a medical image when the computer executable program code is executed on a computer, the method comprising:

applying a multi-scale decomposition to a digital signal representation of the medical image to generate detail images at different scales;

after the multi-scale decomposition applying step, modifying detail signals in the detail images pertaining to the spatially localized phenomena having a first common polarity at at least one of the scales; and leaving unchanged ones of the detail signals pertaining to the spatially localized phenomena having a second common polarity, a spatial extent of a region to which the modifying step is applied being limited to pixels within a neighborhood surrounding a position of the spatially localized phenomena, and the modifying step includes applying an amplification factor to the detail signals to be modified or applying a look up table operation to the detail signals to be modified.

12. A system that generates medical images and enhances contrast of spatially localized phenomena in the medical images, the system comprising:

an imaging system configured to generate the medical images; and a computer system programmed to enhance the contrast by applying a multi-scale decomposition to a digital signal representation of the medical images to generate detail images at different scales, after the application of the multi-scale decomposition, to modify detail signals in the detail images pertaining to the spatially localized phenomena having a first common polarity at at least one of the scales, and to leave unchanged ones of the detail signals pertaining to the spatially localized phenomena having a second common polarity; wherein a spatial extent of a region to which the modifying step is applied is limited to pixels within a neighborhood surrounding a position of the spatially localized phenomena; and the modifying step includes applying an amplification factor to the detail signals to be modified or applying a look up table operation to the detail signals to be modified.

13. The system according to claim 12, wherein the computer system is programmed to apply thresholding to the detail signals having a common polarity.

14. The system according to claim 12, wherein the computer system is programmed to limit the spatial extent of the region to which the modifying step has a fixed shape.

15. The system according to claim 12, wherein the computer system is programmed to determine the spatial extent of the region to which the modifying step is applied by applying connected component analysis at the position(s) of the spatially localized phenomena.

16. The system according to claim 12, wherein the computer system is programmed to determine the spatial extent of the region to which the modifying step is applied by a region growing method having the position(s) of the spatially-localized phenomena as seed point(s).

17. The system according to claim 12, wherein the computer system is programmed to determine the spatial extent of the region to which the modifying step is applied by applying a segmentation algorithm to generate a binary mask signal and by interpolating or reducing the binary mask signal to a resolution at which the modifying step is performed.

18. The system according to claim 12, wherein the imaging system is an x-ray system.

19. The system according to claim 12, wherein the imaging system is a mammography system.

* * * * *